(12) United States Patent
Keller

(10) Patent No.: US 7,206,318 B2
(45) Date of Patent: Apr. 17, 2007

(54) METHOD AND ARRANGEMENT FOR THE IMPROVED EXPLOITATION OF TECHNICAL RESOURCES BETWEEN TELECOMMUNICATIONS NETWORKS AND IP-NETWORKS

(75) Inventor: Walter Keller, Ratingen (DE)

(73) Assignee: T-Mobile Deutschland GmbH, Bonn (DE)

( * ) Notice: Subject to any disclaimer, the term of this patent is extended or adjusted under 35 U.S.C. 154(b) by 1035 days.

(21) Appl. No.: 10/149,816

(22) PCT Filed: Dec. 11, 2000

(86) PCT No.: PCT/DE00/04392

§ 371 (c)(1),
(2), (4) Date: Jul. 23, 2002

(87) PCT Pub. No.: WO01/45352

PCT Pub. Date: Jun. 21, 2001

(65) Prior Publication Data
US 2003/0103506 A1 Jun. 5, 2003

(30) Foreign Application Priority Data
Dec. 16, 1999 (DE) ................ 199 60 733

(51) Int. Cl.
H04J 3/17 (2006.01)
(52) U.S. Cl. ............... 370/433; 370/465
(58) Field of Classification Search ........ 370/433
See application file for complete search history.

(56) References Cited

U.S. PATENT DOCUMENTS 5,537,404 A * 7/1996 Bentley et al. ........ 370/384
6,160,843 A * 12/2000 McHale et al. ........ 375/222
6,263,016 B1 * 7/2001 Bellenger et al. ....... 375/222
6,535,521 B1 * 3/2003 Barghouti et al. ...... 370/462
6,628,670 B1 * 9/2003 Galand et al. ........ 370/468
6,643,262 B1 * 11/2003 Larsson et al. ........ 370/236
6,922,399 B1 * 7/2005 Dirkmann et al. ...... 370/264

FOREIGN PATENT DOCUMENTS

| DE | 197 00 357 | 6/1998 |
|---|---|---|
| WO | WO 98/17079 | 4/1998 |
| WO | WO 99/12380 | 3/1999 |
| WO | WO 99/16266 | 4/1999 |

OTHER PUBLICATIONS

Hublet, C. et al.: *Scaleable Model For High Speed PVC Based Access Networks*, Proceedings of the Broadband Access Conference, Oct. 1999.
Metz, C.: *AAA PROTOCOLS, Authentication, Authorizaztion, and Accounting for the Internet*, IEEE Internet Computing, Nov.-Dec. 1999.

* cited by examiner

Primary Examiner—Chau Nguyen
Assistant Examiner—Jordan Hamann
(74) Attorney, Agent, or Firm—Baker & Daniels LLP

(57) ABSTRACT

A method for the improved exploitation of resources between telecommunications networks and IP networks (for example, corporate LANs or the public Internet) for reducing the costs of permanent connections (always-on connections) and for optimizing IP address economy. During the periods when there is no traffic, the connection between the telecommunications network and the IP network is deactivated, while the subscriber-side connection is maintained. When the subscriber has new data traffic, the RC automatically activates the IP connection concerned to the ISP with reversion to the stored authentication data.

15 Claims, 4 Drawing Sheets

METHOD AND ARRANGEMENT FOR THE IMPROVED EXPLOITATION OF TECHNICAL RESOURCES BETWEEN TELECOMMUNICATIONS NETWORKS AND IP-NETWORKS

The invention concerns a method and arrangement for the connection of a terminal by the user to an IP network via a connecting communications network, for the improved exploitation of technical resources between telecommunication networks and IP-networks (such as corporate LANs, IP-service providers, or the public Internet) to enable cost-effective permanent connections (always-on connections) and to optimize the IP address economy.

The Internet is today a fast growing information source and transaction method for a vast array of applications. This was made possible by international standards and by cost-effective and easily manipulated access, particularly via the home PC. Thus, the most common use in the private market and in the Soho market (Small office—home office) is presently the dial-in function via public or private telephone networks, such as the analog telephone network (public switched telephone network) or the ISDN network (Integrated Services Digital Network). Data rates of 56 kbps or 64 kbps are common here. A different option uses wireless access, such as use of a cellular mobile telephone network (GSM) by means of transparent dial-up connections through a bearer service (BSxx) with 9.6 kbps, for example.

The configuration and access process is normally always the same (FIG. 1). The user (Tln) is connected to the access line (ASL or wireless transmission) to the switching center (Vst) of his network provider via a modem or terminal adapter (TA). The access point (PoP, Point of Presence) of the Internet service provider (ISP, Internet Service Provider or IAP, Internet Access Provider) is on the same or a different switching center.

The ISP architecture consists here normally of at least one dial-in host (RAS, Remote Access Server), which is usually connected to the switching center by a base band or primary multiplex process. Thus the connection between the user and ISP is transparent. Furthermore, the ISP has a so-called IP backbone, a network based on the Internet protocol, various routers as connection nodes to external IP networks, such as to the Internet, and, usually via a server farm, to various service programs, such as FTP (File Transport Protocol), HTTP (Hypertext Transport Protocol), WAP (Wireless Application Protocol), Mail etc. The RAS is a component of the ISP, but it may also in principle belong to the telecommunication network.

The term ISP is used here as a synonym for a certain functionality (as described). Normally, the telecommunication network operators and the Internet service providers are separate firms. However, it is very well possible that both firms belong to the same parent organization or that a telecommunication network operator offers Internet services for his customers and that he is thus simultaneously an ISP. In these cases, the technical realization is largely the same, so that in the following all of these cases will be described only as telecommunication networks and ISP.

The proximity of RAS to the switching center allows for reduced transmission costs, because the conversion between circuit-switched transmission and packet-switched transmission occurs here. Thus, ISPs with a presence in several regions will have regionally distributed network components, at least in the case of dial-in hosts. Communication between RAS and ISP or to the IP backbone can thus not be made by means of LAN technology (Ethernet), but it requires WAN technology (Wide Area Networks). The transmission volume usually does not justify the use of ATM (Asynchronous Transfer Mode), so that E1/T1 relay technology on the basis of primary multiplex interfaces with a 32/24 channel structure is used here primarily, where each channel (base band channel) may be used for several users. This requires the use of a virtual channel (PVC, Permanent Virtual Connection) for each user (for each connection/session), which remains open throughout the entire session. The number of PVC for each primary multiplex interface is limited here. Thus, this restriction leaves some transmission capacity unused, especially if the participants do not communicate much. In the extreme, if the participants are always linked to the Internet, it may happen, for example, that one primary multiplex interface is required for each 128 clients, depending on the technical design and that there is no transmission at all during the non-prime hours. This is an expensive process. Admittedly, the SVC process allows for the switching of more channels in ATM connections, but the broadband connection is very expensive and SVCs are also not available without limits.

ISPs usually do not make their services available free of charge, which means that an additional authentication and billing structure is required, such as a RADIUS server (Remote Access Dial In User Service).

Internet access usually involves three steps. First, there is the network-determined connection process for access to the PoP, usually dialing (numerical dialing). After appropriate authorization (significant for billing for the service), access to the ISP services or to the Internet is granted. The latter is done by means of a transparent IP connection.

The access process is usually automated, using suitable access software of the ISP residing on the PC (Personal Computer) of the user (such as T-Online access software). Here the user usually stores his name and ID (password) at first access; he normally obtains these through a contractual arrangement with the ISP. If the user desires to access the ISP/Internet, he usually starts the relevant application software or access software. The connection is then established via the modem or TA through at least one switching center of the network to the PoP of the ISP. Usually, this connection uses PPP protocol (point-to-point protocol) on level 2 according to the ISO/OSI protocol architecture and the eventual IP (Internet protocol) on level 3 to exchange data, once the network connected dial-up connection has been established.

In this structure, the PoP has an appropriate RAS, where the authorization is handled by user name and password. Subsequently, the user obtains a dynamic IP address from the pool of the ISP that will remain in effect for the entire session. Now the user can access the Internet services by means of appropriate software (such as Netscape Navigator or Microsoft Explorer). When the user terminates the connection or hangs up, the complete session in the RAS is terminated and the dynamic IP address can be awarded anew to another user.

The RADIUS server usually cooperates with the RAS server, but the specific allocation of tasks varies among manufacturers. Usually, the RAS controls the modem or TA pool and communicates with the RADIUS server via RADIUS Client software. The RADIUS server controls the user data files, the user-specific passwords, the subscribed services and the billing data.

The design of dynamic IP addresses is an emergency solution caused by the feature that Internet addresses are limited. The user obtains the dynamic IP address only for the period during which he is authorized to access the Internet (session). Once deactivated, the same IP address may be provided to another user, or the same user obtains a randomly different IP address for his next session. The disadvantage of a dynamic IP: Users having a dynamic IP cannot be addressed as a target.

The process described above has the substantial disadvantage that there is a direct connection between the user and the ISP for the entire session (the entire period of access to the ISP), which normally will generate substantial costs. ISPs take the (expensive) countermeasure of installing PoP in all local switching centers of network operators, so that the access phone costs for the users are minimized. However, this increases the system technology requirements and the line requirements for the ISP substantially.

Because the access procedure with its loading and start of the application and browser software requires much time, the user would prefer to leave his terminal connected permanently (AoS Always on Service), so that he may process transactions or access data without activation time and thus without lost time. A typical example is the Internet user, who would prefer to be linked to his ISP all day long, so he could access single web pages from time to time as needed, without having to go through the entire laborious and time-consuming software and dial-up procedure with password input. Another example is the "PoS application" (Point of Sale credit card terminal) in a department store check-out during peak rush hour. In this instance, speedy transactions without undue delays are particularly desirable. Because a Datex-P connection is too expensive and unprofitable for many businesses, while a dial-up connection to the credit card firm is too slow for the check-out line, many businesses use merely the so-called offline authorization. This refers to a check of their internal data bank to confirm whether this credit card has caused financial problems in previous transactions in their firm. A cost-effective AoS is a vital need here.

As a result of the line charges, the user currently reduces the connect time to a minimum and usually accepts the situation-specific re-establishment of the connection. This behavior favors the IP address management process. The shorter the average connection period (length of session) of users, the more users the ISP can serve with a fixed pool of dynamic IP addresses. However, this problem precludes certain applications, such as PoS with debit card/credit card online authorization, because the permanent online connection costs are too high on the one hand and because the respective activation times are too long on the other hand.

The line cost problem is solved by future packet oriented data networks, such as GPRS services (General Packet Radio Service) in GSM, use of the ISDN-D channel for Internet access in ISDN or broadband xDSL methods (Digital Subscriber Line) with decoupling of a packet data channel prior to the switching center.

These methods allow for a reduction of transmission channels at least within the telecommunication networks, because no network resources are engaged during the transmission-free period. This reduces that cost component.

However, even in these cases, AoS is not possible on an unlimited basis, because there are not enough IP addresses for all users. This problem has been described in L3, for example. The available transmission possibilities (PVC, transmission channels, wires, etc.) form another economic limit.

DE A 197 00 357 describes a method for the connection of a communication terminal to a data network. In this method, an existing toll connection between the communication terminal and the data network are interrupted at the end of a specified period of time, during which no data were transmitted through this connection. In this instance, the physical connection between the communication terminal and the data network is interrupted, leaving a so-called logical connection by which data addressed to the user are treated by the network as though the connection continued to exist. The network stores the data temporarily. The connection between the communication terminal and the data network is re-established at some appropriate time, and the temporarily stored data are transferred to the user. The user authenticates himself to the data network during the establishment process of each new connection by a password provided by the data network. Thus, the connection is severed totally temporarily in this method, and it must later be re-established, a process that requires a certain amount of time.

WO A 99 16266 describes a method for the connection of a communication terminal to a data network, where the optimal routing for data transfer for Internet services between the user terminal and the Internet service provider is determined and applied automatically. This process may choose between a circuit switched and packet switched transmission method. A joint authentication process may be designed for use of both transmission routes. The connection is not designed to be interrupted.

The article by Hublet, C. et al: "Scalable Model for High Speed PVC Based Access Networks", in Proceedings of the Broadband Access Conference, October 1999, pages 155–159, describes high speed Internet access networks with a permanent virtual connection between the service provider and the end user. The connection control and authentication is handled by a special inter-network unit.

Metz, C.: "AAA Protocols; Authentication, Authorization and Accounting for the Internet", in IEEE Internet Computing, November-December 1999, IEEE, USA, Vol. 3, No. 6, pages 75–79, ISSN: 1089-7801, describes methods for the authentication, authorization and accounting for internet services using a so-called Radius Server and Radius clients, which are placed on the signal pathway between the end user and the Internet or the Internet provider.

SUMMARY OF THE INVENTION

The present invention has the objective of identifying a method to use limited user-specific resources, such as IP address segments, transmission channels and PVCs etc. more efficiently, so that, for example, "Always On" connections to ISPs, to private IP networks or to the Internet etc. may be obtained at acceptable technical cost, even for large numbers of users.

This objective is solved by a method for the user-initiated connection of a user communication terminal to an IP network via a connecting communications network with an access, authentication and multiplex apparatus located in the communications network or in the access node (RAS) with an authentication system, which is connected to the ISP-specific authentication system established in the IP network. The method comprises the access, authentication and multiplex apparatus deactivating the connection between the communications network and the IP network in the absence of traffic and storing user-specific and session-specific connection data (SAD) while the connection between the user communication terminal and the communications network remains open. Then the IP connection in question is automatically re-activated on the basis of the stored user-specific and session-specific authentication data when the user sends renewed data traffic.

BRIEF DESCRIPTION OF THE DRAWINGS

The invention is described schematically by use of figures, which here present merely a possible embodiment using the example of GPRS services in an expanded GSM network (Ref. 1), where additional applications and claims derive from the Figures. Regarding the GSM network and the GPRS service, a general reference is made to the literature: "The GSM System for Mobile Communications", Michel Mouly, Marie-Bernadette Pautet, Cell & Sys Verlag, France, 1992, ISBN 2-9507190-0-7, and to the specification ETSI GSM 03.60 V6.2.0, 10/98, Digital Cellular Telecommunications System (Phase 2+); GPRS Service Description Stage 2. The figures show:

DETAILED DESCRIPTION

Figure 2:
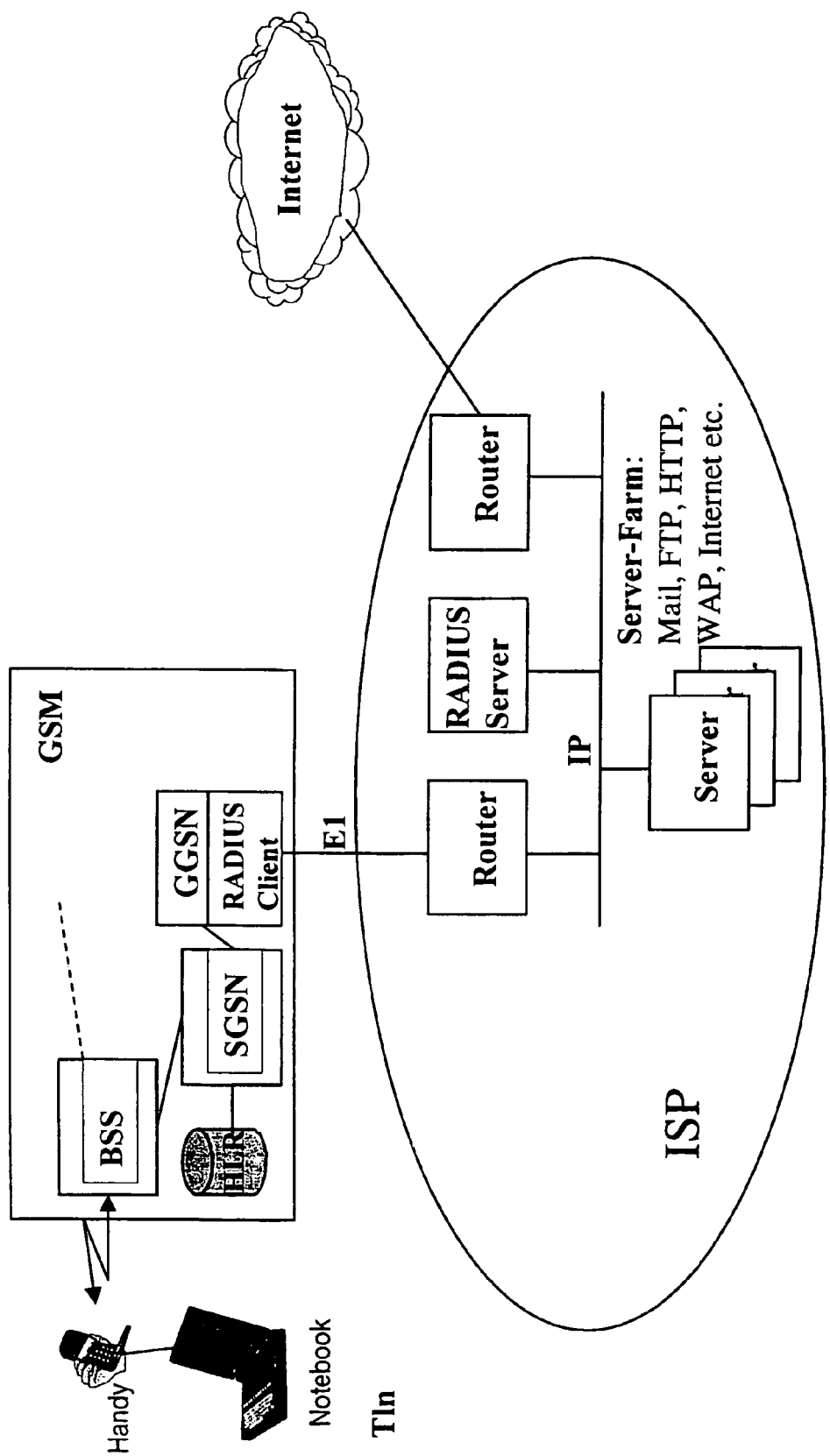

FIG. 2 shows the typical ISP access to the GSM network via the GPRS service. The GPRS service is a packet-oriented transmission mode in the cellular GSM network. Here the GPRS traffic is decoupled in the base station subsystem (BSS) and is forwarded to the Serving GPRS Support Node (SGSN). The SGSN is responsible for the mobility management of the terminals, authentication, encoding, data compression and error correction at the air interface. In particular, the SGSN is connected to the home location register (HLR) of the GSM network (user data bank). The SGSN is connected to the Gateway GPRS Support Node GGSN. This establishes the connection to external IP networks, terminates the network-internal packet connection to the user, translates the addresses (Network Address Translation, NAT, see IETF RFC 1631), if needed, and offers furthermore functions, such as safe tunneling through external networks etc. An essential set of tasks within GPRS is also the authentication of the user to the respective external IP network. For this purpose, each external network that is connected has an Access Point Name (APN), for which the access authorization of the respective user is stored in the HLR.

Thus, the GSM network may verify that a specific user "x" has contracted for access to ISP "y" with a certain quality level of service QoS "z" and may bill for this connection, but the establishment of the actual connection still requires the additional authentication and authorization (and billing) by the ISP. For this end, the GGSN has a RADIUS client, which clarifies the access rights with the ISP RADIUS server (see IETF RFC 2138) and establishes the IP connection to the ISP, if warranted. This also allocates the dynamic IP address of the ISP (see IETF RFC 791). Access to a firm network (corporate LAN) is similar.

The GPRS service normally has four steps to establish the connection to the ISP. First, the "handy" [cellular phone] (Mobile Station MS) is switched on and the authentication of network access and the password (PIN) of the user are checked by virtue of the International Mobile Subscriber Identity (card identification number, IMSI), which is stored in the Subscriber Identification Module (GSM card, SIM). If the user also wishes to transfer data, the GPRS service may be contacted to verify the service authorization (GPRS attach). Then follows the contact to the ISP with two-step authentication of authorization (APN on the network side and RADIUS on the ISP side). The MS sends here a PDP context request to the SGSN, which contains the PDP type, PDP address (desired IP address variant), APN and, if needed, the QoS request. The SGSN sets up the connection to the GGSN in this process. The GGSN terminates the network-internal PDP connection and in turn establishes the connection to the external network, where a resident RADIUS client may substitute for the MS with its access data (password) to undertake a RADIUS authentication (PAP, CHAP) with the RADIUS server possibly included in the target network and obtains the dynamic IP address (IPCP), if needed. If needed, the GGSN also establishes a T2TP connection (Layer 2 Tunnelling Protocol) to the target network (data security). The IP connection is finally in place and the user may communicate.

The termination of the communication reverses the procedure. The network provider or the software application of the user have the option to automate the activation process more or less, comparable to the methods used in fixed wire networks.

In any case, the entire authentication process consumes a not insubstantial amount of time, which leads to timing problems and/or loss of ease of use in many applications. In addition, the user will normally use a PC (notebook/palmtop etc.) for Internet access, which means that he will need to turn this unit on, boot the operating system, load the cellular phone driver (connection cellular phone to notebook), initiate the communication from the cellular phone (RS232, IrDa, Bluetooth etc.) and start the connection software (access software) and the Internet browser. That requires additional time and makes AoS critically important.

The virtual connection to the ISP and the IP address are blocked throughout the entire session, however, which will thus preclude the use of AoS as the standard service for the mass market.

A resource-conserving connection between GGSN and the ISP would facilitate a cost-effective AoS.

The present invention, in accordance with one embodiment, comprises the following connection process.

Figure 3:
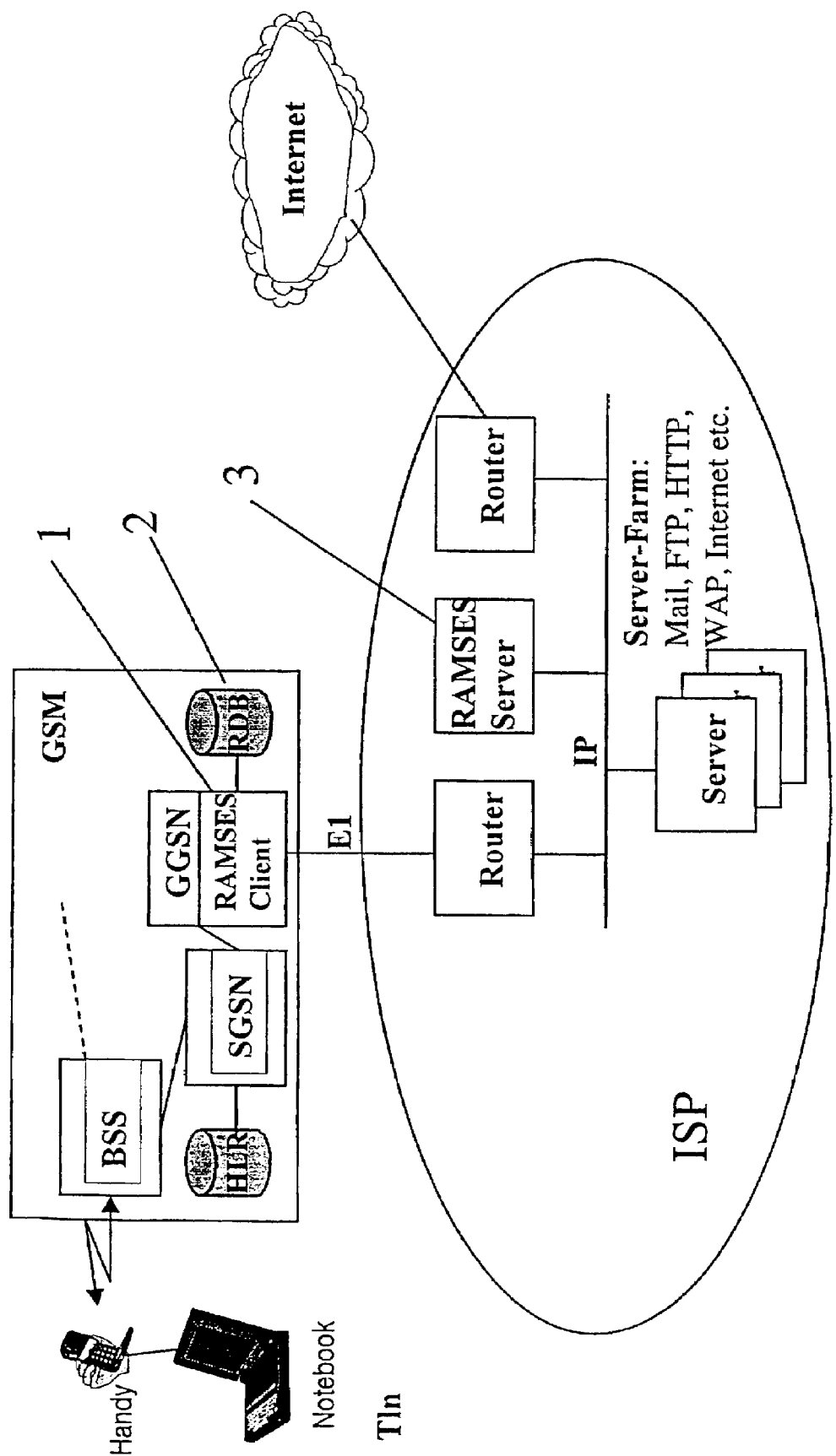
Figure 4:
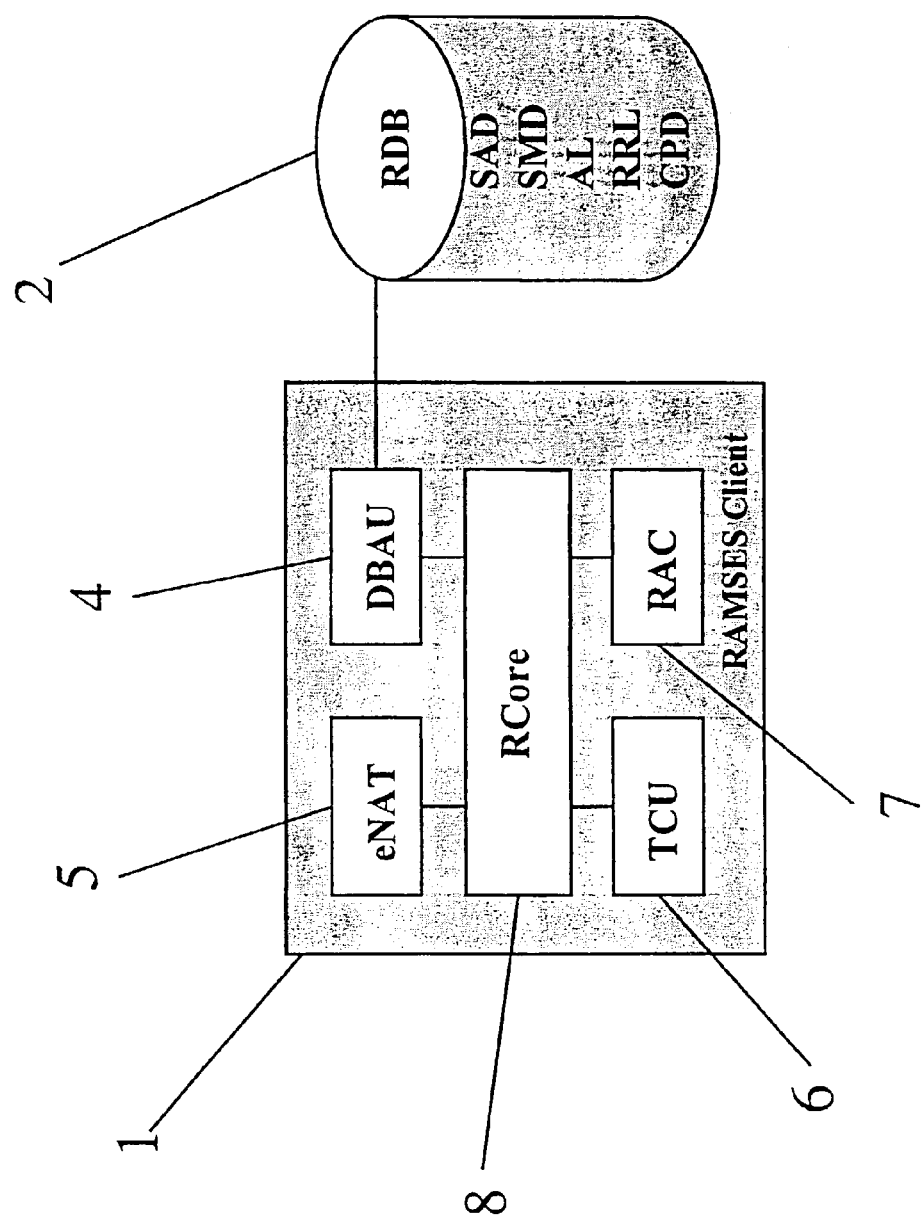

As is shown in FIG. 3, a multiplex system is used for ISP access, which is here called RAMSES (Remote Access Management Subscriber Enhanced Service). The GGSN is functionally enlarged to this end. The RAMSES client (RC/1) is substituted for the RADIUS client, and it is augmented by a storage device or databank (RDB/2); here the RAMSES client communicates with the RAMSES server (3) on the ISP side. The RAMSES client includes in a possible embodiment, as shown in FIG. 4, the following: A central control unit (RCore/8), a databank control unit (DBAU/4), an augmented IP address transformation unit (eNAT/5), a data traffic controller (TCU/6) and access control for the RAMSES server (RAC/7). Additional RAMSES functions, such as tunneling protocols, DHCP service etc. are possible and useful under IP standards, but do not add at this point necessarily to an explanation of the invention.

The establishment of the connection follows the described process, but involves here the RAMSES client and the RAMSES server. The RAMSES client stores here the user-specific authentication data of the IP network (Session Authentication Data, SAD) in RDB (2) in connection with the required user-specific connection data (Session Management Data, SMD; or PDP Context Data).

The TCU notes whether there is data traffic specific to the user. On the basis of pre-defined criteria, such as a transmission-free time period, the GGSN breaks the connection from the ISP to the RAC, but, contrary to the usual process, it maintains the connection to the user, so that this process is transparent to the user. The new connection status is updated in the SMD register.

The dynamic IP address of the ISP and other interface resources may now be used in other processes.

When the user sends another data packet, this is noted by the TCU. The RAMSES client automatically initiates a new ISP authentication, using the stored SAD, and activates the connection to the ISP. Here the RAMSES client obtains a new dynamic IP address and sets up a new internal connection to the user. The address management and the allocation are handled by the eNAT unit, the data (address list, AL) are stored in the RDB. Because a change of an IP address is not defined during an existing IP session, the process of the invention is based on use of NAT, where the current external address may always be linked again with the stored internal address, even during a user session, as needed, as an augmentation of the known NAT process.

The entire process is entirely transparent to the user, other than a fleeting delay for the renewed authentication process, and it enables the use of AoS for the network providers/ISP on the user side, even for a multitude of simultaneous users in the mass market.

Furthermore, the RDB contains user-specific data (customer profile data, CPD) as user-specific criteria for termination and re-establishment of the connection to the ISP (timing criteria, priority, QoS, etc.).

For compatibility reasons, the RAMSES client cooperates with existing applications even for current RADIUS servers, because the required additional activities are handled in the RAMSES client.

As an option, the RAMSES server may facilitate additional functions, such as the ISP's recognition of the entire user session, i.e. for billing purposes. Furthermore, certain augmentations of the protocol between the RAMSES client and the RAMSES server can set up a link to the user on demand from the ISP, even if the connection between the two sides is de-activated, which may be done, for example, by additional use of port addresses (IP masquerading), a unique IP address range or a unique designation for de-activated connections on this segment. A typical application for this feature is an e-mail broadcast from the ISP to the user, while the connection is deactivated.

The activation by the ISP may be done, for example, by having the RAMSES server send an activation demand with a jointly known user reference to the RAMSES client, whereupon the RAMSES client undertakes an activation in the same manner as for the transmission of data packets by the user.

For example, this may be an e-mail request, which is augmented by the client by the IP address and the TCP port number and which is mirrored to the ISP e-mail server. The reference address for de-activated users (Reverse Reference List, RRL) is stored in the RDB on the client's side and is in effect for at least one user session.

If needed, the RDB may be formed by the augmentation of possibly existing databanks (such as HLR in the GSM network).

The RAMSES method allows for the option of an appropriate division of client shares among various network nodes. Thus, it may be useful, for example in optimizing the network-internal data storage or in expanding the range of application, such as for use of the RAMSES method for AoS connections for GPRS International Roaming or for data transmission between two GPRS networks, to separate the RAMSES functionality, for example, to SGSN (RCore, TCU, and DBAU), to HLR (RDB with SAD, SMD, CPD) and to GGSN (eNAT, RAC, AL and RRL).

Figures and Attachments

Figure 1:
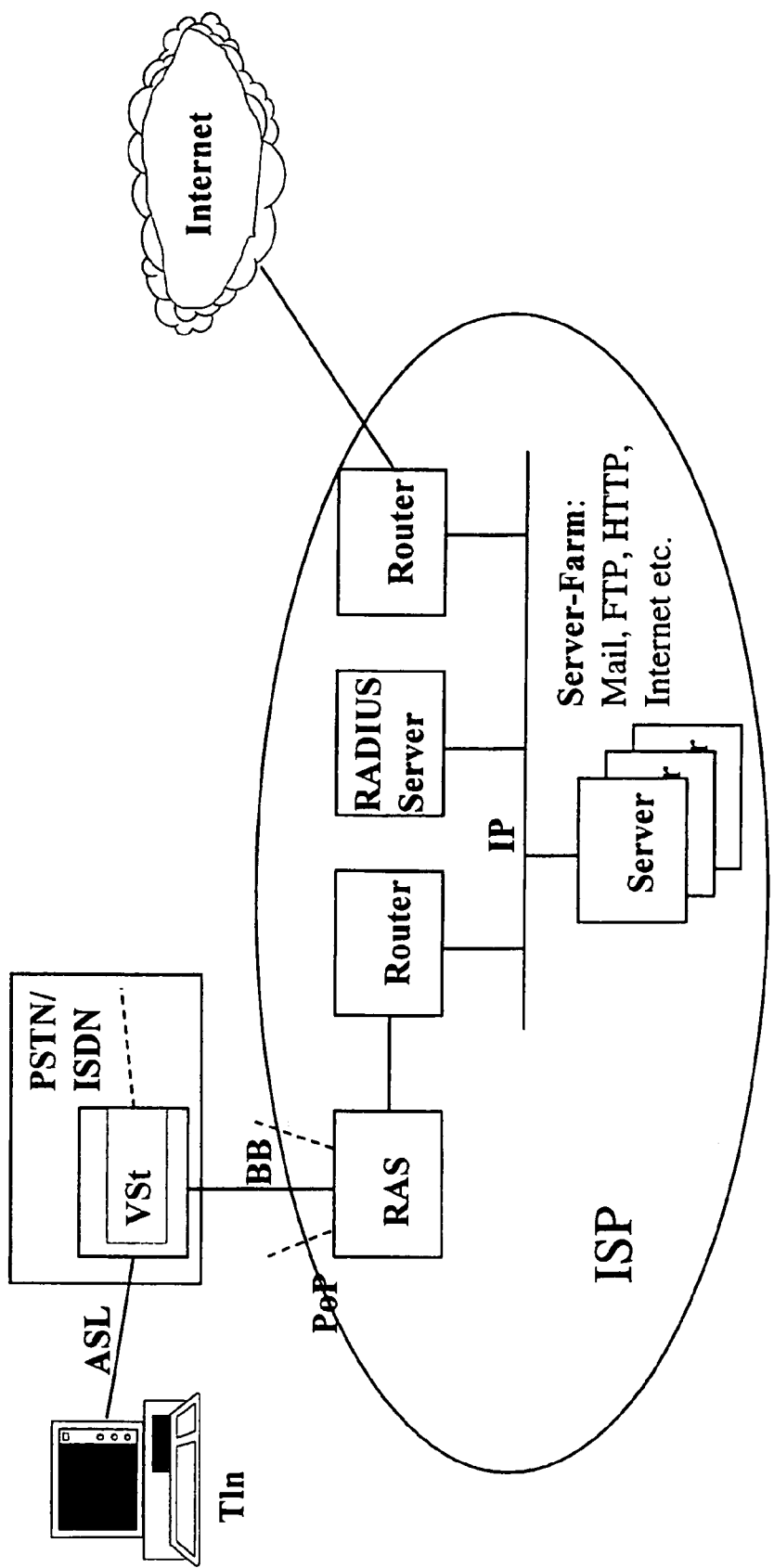
FIG. 1 Access Configuration via the Telecommunications Network to the ISP or the Internet FIG. 2 Configuration for GPRS Service of the GSM Network FIG. 3 GPRS Configuration Using the Method Described in this Invention FIG. 4 Example of a Configuration for Access, Authentication and Multiplexing and the Associated Storage Device

FIG. 1 Access Configuration via the Telecommunications Network to the ISP or the Internet FIG. 2 Configuration for GPRS Service of the GSM Network FIG. 3 GPRS Configuration Using the RAMSES Method FIG. 4 RAMSES Client and RAMSES Databank

| Abbreviations | |
|---|---|
| AL | Address list |
| AoS | Always on Service |
| APN | Access Point Name |
| BB | Base Band |
| Bluetooth | Serial infrared interface (www.bluetooth.com) |
| BSS | Base Station Subsystem |
| CHAP | Challenge Handshake Authentication Protocol |
| CPD | Customer Profile Data |
| DBAU | Database Access Unit |
| DHCP | Dynamic Host Configuration Protocol |
| eNAT | enhanced NAT |
| GGSN | Gateway GPRS Support Node |
| GSM | Global System for Mobile Communications |
| HLR | Home Location Register |
| IMSI | International Mobile Subscriber Identity |
| IP | Internet Protocol |
| IrDa | Infrared Data Association (www.irda.org) |
| ISDN | Integrated Services Digital Network |
| ISM | Internet Session Multiplex Service |
| LAN | Local Area Network |
| MS | Mobile Station |
| NAT | Network Address Translation |
| PAP | Password Authentication Protocol |
| PC | Personal Computer |
| PDP | Packet Data Protocol |
| PIN | Personal Identification Number |
| PoP | Point of Presence |
| PPP | Point-to-Point Protocol |
| PSTN | Public Switched Telephone Network |
| PVC | Permanent Virtual Connection |
| QoS | Quality of Service |
| RAC | Remote Access Control |
| RADIUS | Remote Access Dial In User Service |
| RAMSES | Remote Access Management Subscriber Enhanced Service |
| RAS | Remote Access Server |
| RC | RAMSES Client |
| RCore | RAMSES Core |
| RDB | RAMSES Data Base |
| RRL | Reverse Reference List |
| RS232 | Serial communications interface |
| SAD | Session Authentication Data |
| SAD-DB | SAD Databank |
| SGSN | Serving GPRS Support Node |
| SIM | Subscriber Identification Module |
| SMD | Session Management Data |
| Soho | Small office/home office |
| SVC | Switched Virtual Circuit |
| T2TP | Layer 2 Tunneling Protocol |
| TA | terminal Adapter |
| TCU | Traffic Control Unit |
| Tln | User |
| UMTS | Universal Mobile Telecommunication Services |
| VSt | Switching center |
| WAN | Wide Area Network |
| xDSL | Digital Subscriber Line |

REFERENCES

L1 The GSM System for Mobile Communications, Michel Mouly, Marie-Bernadette Pautet, Cell & Sys Verlag, France, 1992, ISBN 2-9507190-0-7

L2 ETSI GSM 03.60 V6.2.0, 10/98, Digital Cellular Telecommunication System (Phase 2+); GPRS Service Description Stage 2

L3 Breitbandzugang mit PPP-over-Ethernet und xDSL [Broadband Access with PPP-over-Ethernet and xDSL], Torsten Musiol, ntz 7/1999

L4 IETF RFC 1631

L5 IETF RFC 2138

L6 IETF RFC 791

The invention claimed is:

1. A method for the user-initiated connection of a user communication terminal to an IP network via a connecting communications network with an access, authentication and multiplex apparatus located in the communications network or in a Remote Access Server access node (RAS) with an authentication unit, which is connected to the ISP-specific authentication system established in the IP network, said method comprising:

the access, authentication and multiplex apparatus deactivating the connection between the communications network and the IP network in the absence of traffic and storing the user-specific and session-specific connection data SAD while the connection between the user communication terminal and the communications network remains open;

automatically re-activating the IP connection in question on the basis of the stored user-specific and session-specific authentication data when the user sends renewed data traffic; and overwriting the SAD during each user-initiated session and thus storing it again, where the access, authentication and multiplex apparatus automatically relies on modified ISP authentication data.

2. The method according to claim 1, including statistically using limited resources between the communications network and IP network, including one or more of dynamic IP addresses, PVCs, transmission channels and wires, for several users, requiring no additional actions by the users during the session in question thus being essentially unnoticed and transparent.

3. The method according to claim 1, including storing the SAD during user-initiated establishment of a connection, i.e. during the initiation of a session, by the access, authentication and multiplex apparatus and maintaining the SAD temporarily, at least during the complete user-specific session, in a specific storage device RDB, where such data are selected and used by the access, authentication and multiplex apparatus to establish the connection during each continuing user session.

4. The method according to claim 1, and augmenting the information exchange between the access, authentication and multiplex apparatus and the authentication unit by the relevant information to detect a user session in all possible de-activation phases of the access, authentication and multiplex apparatus.

5. The method according to claim 1, and augmenting the information exchange between the access, authentication and multiplex apparatus and the authentication unit by the relevant information to enable the ISP to activate temporarily de-activated connections between terminal and communications network, in order to facilitate e-mail traffic to the user.

6. The method according to claim 1, and causing the functionality of the access, authentication and multiplex apparatus and authentication unit to be distributed to various network nodes within the communications network, including one or more of SGSN, GGSN, and HLR in the GSM network, or to several network components of an ISP network or to network nodes of both networks.

7. The method according to claim 1, and causing the functionality of the access, authentication and multiplex apparatus and authentication unit to be also used between identical or different telecommunication networks with packet data transmission, including one or more of the GSM-GPRS networks, UMTS networks and/or X.25 networks.

8. A method for the user-initiated connection of a user communication terminal to an IP network via a connecting communications network with an access, authentication and multiplex apparatus located in the communications network or in an access node (RAS) with an authentication unit, which is connected to the ISP-specific authentication system established in the IP network, said method comprising:

the access, authentication and multiplex apparatus deactivating the connection between the communications network and the IP network in the absence of traffic and storing the user-specific and session-specific connection data SAD while the connection between the user communication terminal and the communications network remains open;

automatically re-activating the IP connection in question on the basis of the stored user-specific and session-specific authentication data when the user sends renewed data traffic; and erasing the SAD automatically efased at the end of a user session in order to prevent data misuse.

9. The method according to claim 8, and having the access, authentication and multiplex apparatus monitor the user-specific data traffic by means of an appropriate monitoring device to be used to de-activate the IP connection, where particularly temporal criteria, such as the elapsed time since the last transmission, are used as criteria for de-activation.

10. The method according to claim 8, and having the authentication unit communicate the reference address at issue within an activation demand to the access, authentication and multiplex apparatus for purposes of ISP-initiated re-activation of a de-activated connection, which then undertakes the activation of the user connection to the ISP.

11. A method for the user-initiated connection of a user communication terminal to an IP network via a connecting communications network with an access, authentication and multiplex apparatus located in the communications network or in an access node (RAS) with an authentication unit, which is connected to the ISP-specific authentication system established in the IP network, said method comprising:

the access, authentication and multiplex apparatus deactivating the connection between the communications network and the IP network in the absence of traffic and storing the user-specific and session-specific connection data SAD while the connection between the user communication terminal and the communications network remains open;

automatically re-activating the IP connection in question on the basis of the stored user-specific and session-specific authentication data when the user sends renewed data traffic; and causing the access, authentication and multiplex apparatus to undertake an IP address transformation eNAT such that the ISP-designated dynamic user IP address is newly stored for each connection initiation by the access, authentication and multiplex apparatus in a data base (RDB); and is used for the data traffic on both sides between the user and the ISP, where in augmentation beyond the previous Network Address Translation NAT method there is now the possibility of multiple address allocations during a user session and where the address data are now stored in the RDB in the format of an address list AL.

12. The method according to claim 11, and having the de-activation criteria for each user CPD stored in the RDB, where the criteria for each user may be modified at least from the network provider side, but also from the user's side.

13. The method according to claim 11, including storing the activation criteria for each user in the RDB, where the criteria for each user may be modified from the network provider side and also from the user's side, where, in addition to the criteria for data transmission, there are additional priority criteria for re-activation.

14. The method according to claim 11, and providing an agreement between the access, authentication and multiplex apparatus and the authentication unit regarding an additional reference address for the purpose of an ISP-initiated re-activation of a de-activated connection, which is maintained by the access, authentication and multiplex apparatus within a specific Reverse Reference List in the RDB.

15. The method according to claim 11, and having the functionality of the RDB operate as an augmentation of databases existing within the network.

* * * * *

UNITED STATES PATENT AND TRADEMARK OFFICE
CERTIFICATE OF CORRECTION

PATENT NO. : 7,206,318 B2 Page 1 of 1
APPLICATION NO. : 10/149816
DATED : April 17, 2007
INVENTOR(S) : Walter Keller It is certified that error appears in the above-identified patent and that said Letters Patent is hereby corrected as shown below:

Title page Item [57]
In the Abstract, Line 2, after "Internet)" insert --,--

Claim 8, Column 10, Line 27, delete "efased"

Signed and Sealed this

Twelfth Day of June, 2007

JON W. DUDAS
*Director of the United States Patent and Trademark Office*